July 14, 1925.
T. MASON
WATER CLOSET BOWL SUPPORT
Filed Feb. 26, 1925
1,545,839
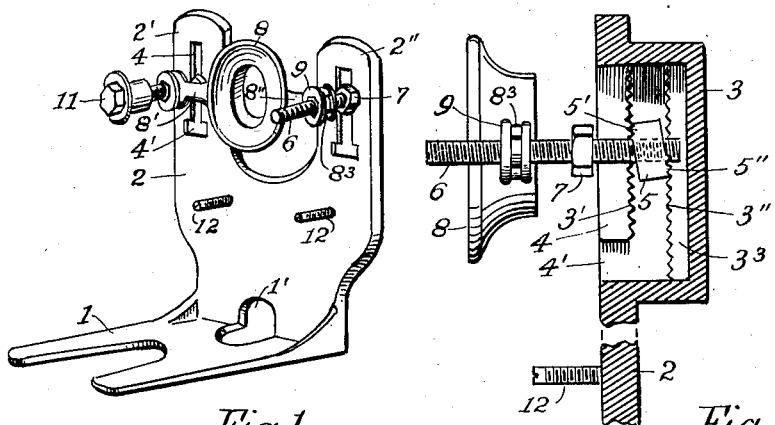
Fig. 1.
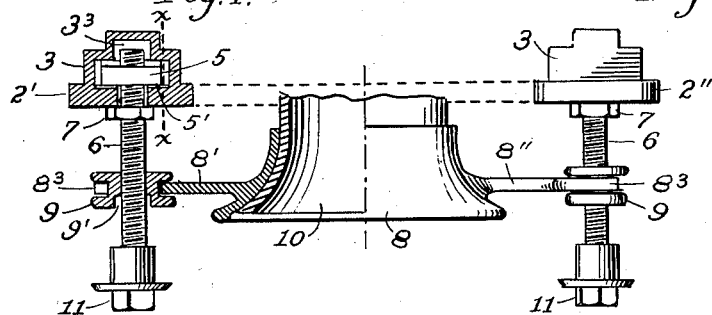
Fig. 3.
Fig. 2.
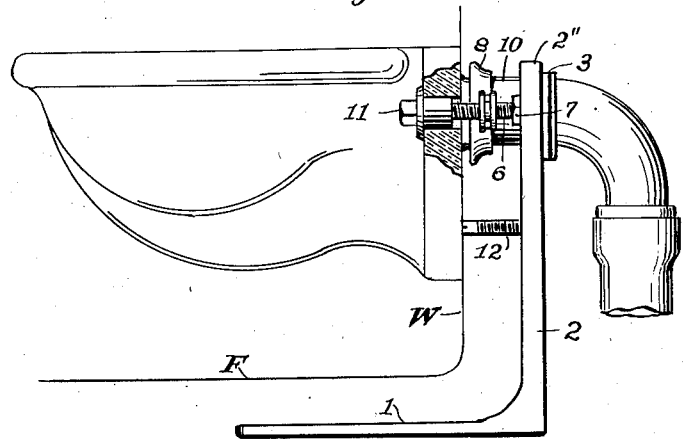
Fig. 4.
INVENTOR.
Thomas Mason
BY
ATTORNEY Patented July 14, 1925.

1,545,839

UNITED STATES PATENT OFFICE.

THOMAS MASON, OF EAST ORANGE, NEW JERSEY.

WATER-CLOSET-BOWL SUPPORT.

Application filed February 26, 1925. Serial No. 11,719.

*To all whom it may concern:*

Be it known that I, THOMAS MASON, a citizen of the United States, and resident of East Orange, county of Essex and State of New Jersey, have invented new and useful Improvements in Water-Closet-Bowl Supports, of which the following is a specification.

My invention relates to that class of water-closet bowls supported from a bracket placed in a wall and free from the floor and has for its object the providing of a support of a fixed or standard height and having means for vertical adjustment of said bowl of novel construction.

Another object is to provide a fitting or fixture having horizontal adjustment whereby the connecting of the bowl with the soil pipe can be easily and accurately done.

A further object is to provide a support and fixture on which a broken bowl can be replaced without disturbing the tiling or wall in which the support may be fastened and secured.

My invention is shown in the accompanying drawings, in which Figure 1 is a perspective view of the support and connecting fixture, one flanged cap-nut being omitted for clearness of view.

Figure 2 is a top view of the two upright arms shown in Figure 1, one-half being shown in section, the dot and dash line being the centre.

Figure 3 is a sectional view of the vertical adjustment—on line $x$—$x$ of Figure 2— showing the locking device more fully described hereinafter, and Figure 4 is a side elevation of a bowl positioned upon and connected to the support and soil pipe, the bowl being partly broken away.

Like numerals of reference represents similar parts in the several views.

The support is of a single piece of cast iron and is composed of a foot, 1, and the vertical frame or member, 2; the frame has two upwardly extending arms, 2' 2" having cored-out boxes, 3, which enclose, rearward, a vertical slot, 4, widened at the bottom, 4' for the passage of the nut, 5, into which the bowl supporting screws, 6, screw. All of the above, except the nut and screw are cast integral.

The construction of both arms being exactly alike, I will describe one arm only as applying to both. The box, 3, has teeth, 3' cast internally on each side of the vertical slot—being the back of the frame, 2—and another row of teeth, 3" cast in the rear of the box on each side of a vertical channel, $3^3$ which affords space for the end of the screw, 6. These boxes protect the interior from any cement or other building material and permit the nut and screw to be easily adjusted as to height.

The nut, 5, is rectangular in shape and of a size suited to pass through the widened opening, 4', and be placed at any height within the box. This nut has a series of longitudinal teeth, 5', at the top on one face to engage the teeth of the frame, and similar teeth at the bottom of the other face, 5", to engage the teeth in the rear of the box as shown in Figure 3, the nut being tapped about five degrees from a vertical centre for the purpose specified hereinafter. A locknut, 7, is fastened up tight when once the proper height of the bowl has been determined.

The soil pipe connection is a composite fixture and consits of the usual bell shaped flange, 8, having two arms, 8' 8" diametrically opposite each other on the periphery as shown. These arms are forked at the end, $8^3$ where they are engaged between the two flanges of a nut, 9, horizontally adjustable on the screw, 6. The nuts have a countersunk hexagon recess 9' into which a hollow wrench is placed for such adjustment.

A lead soil pipe, 10, is flanged over within the fitting, 8 and soldered in place as usual.

The front end of the screws, 6, are surmounted by a flange cap-nut, 11, enlarged in diameter where it enters the hole in the bowl as shown in Figure 4 at the broken away part. These two flanged cap-nuts being the only visible metal parts when the bowl is fastened in position, I prefer to make of a nonferrous metal so that any water or moisture will not stain the porcelain.

Jack screws, 12, are screwed at a proper point in the vertical support so that when adjusted the inner surface of the bowl will press up against the free end.

I prefer to cast an opening 1', between the foot and the vertical section of the support so that cement or any binding material will pass freely between the back and front and around the foot when such a foundation is used.

In Figure 4, the floor line is shown by F and the wall line by W.

Such being the construction, the operation is as follows:

When the support has been placed in position at a soil pipe opening and properly fastened, the screws, 6, with nuts, 5, are placed at an approximate height in the slots.

When the screw is at rest, the leverage causes the teeth in the nut to engage both rows of teeth in the box and will stay there until the front end of the screw is raised thereby releasing the nuts from the teeth and permitting any vertical adjustment. The flanged fixture is next positioned by the flanged nuts, 9, being placed to engage the forks and these nuts advanced until the end of the soil pipe passes into the flange, 8 where it is swedged over the inner surface and soldered as usual.

The bowl is placed in position by the two screws, 6 entering the holes provided in the bowl and the height in relation to the soil pipe is easily adjusted by raising one or the other screws; the nut is disengaged from the teeth and is free to move up or down any number of teeth. When the screw is released the nut is locked, and holds the screw in that position; the lock-nut 7 is tighted up against the front of the support as shown in Figure 2 and firmly holds the screw 6 in place.

When the bowl is positioned, the spud or outer end is imbedded in putty or other water-tight composition; the fixture carrying the soil pipe is either advanced or set back to insure a tight joint.

To hold all the parts together, the flanged cap-nuts are screwed down, whereby the bowl and the spud are pressed inwardly against the encircling putty and against the jack screws.

To remove a broken bowl it is only necessary to unscrew the two flanged cap-nuts, fit a similar shaped bowl as the one just removed into position, adjust the jack screws for any unequal or irregular back line, adjust the flanged fixture 8, imbed in putty and connect up.

Such being my invention what I claim is:

1. In a support for water-closet bowls a foot, a vertical frame having slots for vertical adjustment, cast integral; of a screw mounted in each of said slots; of a composite fixture for soil pipe connection consisting of a flanged member having two diametrically extending arms and having means for horizontal adjustment of said fixture upon two screws first mentioned, and flanged cap-nuts on the free end of said screws.

2. In a support for water-closet bowls a foot, a vertical member, of two slots in said vertical member, open at the front but completely closed at the rear forming a box, of horizontal teeth in the front and rear of said box, all cast integral.

3. In a support for water-closet bowls a foot, a vertical member having two upwardly extending arms, of a vertical slot in each arm widened at the bottom and of a box covering said slots at the back, said box having rows of horizontal teeth on the front and rear faces all cast integral, and of means for connecting a bowl to said support whereby a water-tight joint is made between the bowl and the soil pipe.

In testimony whereof, I hereunto affix my signature.

THOMAS MASON.